(12) United States Patent
Balasenthan

(10) Patent No.: US 11,993,400 B2
(45) Date of Patent: May 28, 2024

(54) APPARATUS FOR TRANSPORTING A VEHICLE TO SPACE

(71) Applicants: Balasenthan, Tiruppur (IN); Premalatha, Tiruppur (IN)

(72) Inventor: Balasenthan, Tiruppur (IN)

(*) Notice: Subject to any disclaimer, the term of this patent is extended or adjusted under 35 U.S.C. 154(b) by 61 days.

(21) Appl. No.: 17/919,255

(22) PCT Filed: Apr. 12, 2021

(86) PCT No.: PCT/IB2021/052990
§ 371 (c)(1),
(2) Date: Oct. 15, 2022

(87) PCT Pub. No.: WO2021/209874
PCT Pub. Date: Oct. 21, 2021

(65) Prior Publication Data
US 2023/0159187 A1    May 25, 2023

(30) Foreign Application Priority Data
Apr. 15, 2020   (IN) .............................. 202041016207

(51) Int. Cl.
*B64G 1/00* (2006.01)
*B64G 5/00* (2006.01)

(52) U.S. Cl.
CPC ............... *B64G 1/002* (2013.01); *B64G 5/00* (2013.01)

(58) Field of Classification Search
CPC ........... B64G 1/002; B64G 5/00; B64G 99/00
See application file for complete search history.

(56) References Cited

U.S. PATENT DOCUMENTS

| 4,656,959 A  | * | 4/1987 | Moisdon ................. B63B 35/44 |
| | | | 114/330 |
| 10,562,599 B1 | * | 2/2020 | Toth ....................... B63B 35/44 |
| 11,041,692 B1 | * | 6/2021 | Chromych ............ F41F 3/0413 |

FOREIGN PATENT DOCUMENTS

JP           3206225 U  *  9/2016
WO    WO-2018236938 A1 * 12/2018 ............. B64C 30/00

* cited by examiner

*Primary Examiner* — Valentina Xavier

(57) ABSTRACT

The present invention explains an apparatus 100 for transporting a vehicle 111 to space comprising a vertical tower 101 having an upper end 116 and a lower end 117 wherein the lower end 117 is below sea level 108 and a horizontal pipe 102, connected to the lower end 117 of the vertical tower 101. The vertical tower 101 is filled with water and the horizontal pipe 102 extends underground to sea shore 110. The horizontal pipe 102 includes a valve 104 for outlet of water. A horizontal inlet pipe 105 connected to the vertical tower 101 below the sea level 108, wherein the horizontal inlet pipe 105 includes a valve 106 for inlet of water. A plurality of shutters 107, 113, 114, 115 placed at intervals in the vertical tower 101; and a platform 112 is provided at the upper end 116 of the vertical tower 101.

7 Claims, 1 Drawing Sheet

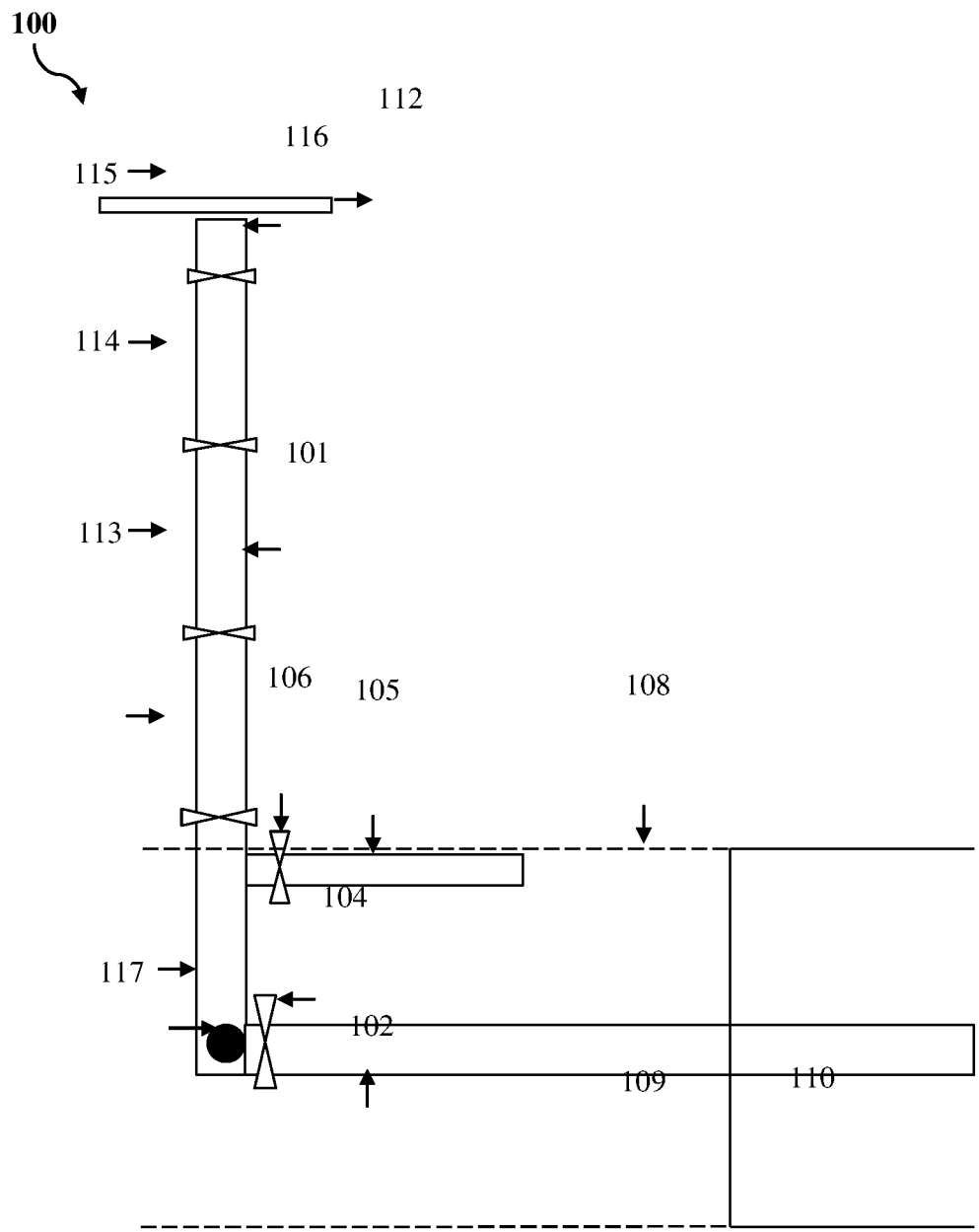

APPARATUS FOR TRANSPORTING A VEHICLE TO SPACE

FIELD OF INVENTION

The embodiments herein generally relate to an apparatus for transporting vehicles. More specifically, the embodiments provide an apparatus for transporting vehicles to space.

BACKGROUND AND PRIOR ART

A space elevator is proposed type of a planet-to-space transportation system. A known type of space elevator includes a cable (also called a tether) anchored to surface of a planet and extend into space. Vehicles travel along the cable from the planetary surface, such as the Earth's, to space or orbit, without the use of large rockets.

Conventionally, a proposed Earth-based space elevator consists of a cable with one end attached to the surface near the equator and the other end extending into space beyond geostationary orbit (35,786 km altitude). However, these proposed space elevators do not provide adequate safety for humans to travel to space. Also, the speed of these space elevators will be slower due to presence of mechanical means.

Therefore, there is a need for an economical space elevator for safely launching satellites and man into space. Moreover, there is a need for an environmentally friendly apparatus for transporting vehicles to space at a higher launching speed.

OBJECTS OF THE INVENTION

Some of the objects of the present disclosure are described herein below:

A main object of the present invention is to provide an apparatus for transporting vehicles to space.

Another object of the present invention is to provide an apparatus for transporting vehicles to space at higher speed.

Yet another object of the present invention is to provide an apparatus with higher safety for transporting vehicles and humans to space.

Still another object of the present invention is to provide an economical apparatus for transporting vehicles to space.

The other objects and advantages of the present invention will be apparent from the following description when read in conjunction with the accompanying drawings, which are incorporated for illustration of preferred embodiments of the present invention and are not intended to limit the scope thereof.

SUMMARY OF THE INVENTION

In view of the foregoing, an embodiment herein provides an apparatus for vertically transporting a vehicle to space. In accordance with an embodiment, the apparatus includes a vertical tower having an upper end and a lower end wherein the lower end is below sea level. A horizontal pipe is connected to the lower end of the vertical tower wherein the horizontal pipe extends underground to the sea shore. The vertical tower is filled with water and the horizontal pipe includes a valve for outlet of water. A horizontal inlet pipe is connected to the vertical tower below the sea level wherein the horizontal inlet pipe includes a valve for inlet of water. In an embodiment, a plurality of shutters is placed at intervals in the vertical tower and a platform is provided at the upper end of the vertical tower.

In accordance with an embodiment, height of the vertical tower extends to 100 km till the Kármán line. In an embodiment, shape of the vertical tower is cylindrical.

In accordance with an embodiment, the vehicle is a launcher. In an embodiment, the vehicle is placed at the intersection of the horizontal pipe and the vertical tower. The density of the vehicle is lesser than water.

In accordance with another embodiment, a plurality of wind turbines is placed on outer surface of the vertical tower for generating electricity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 illustrates a schematic diagram of an apparatus 100 for transporting vehicles to space, according to an embodiment herein.

LIST OF NUMERALS

100—Apparatus for transporting vehicles to space
101—Vertical tower
102—Horizontal pipe
104—Valve
105—Horizontal inlet pipe
106—Valve
107,113,114,115—Shutter
108—Sea level
109—Sea
110—Sea shore
111—Vehicle
112—Platform
116—Upper end
117—Lower end

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need for an economical and environmental friendly space elevator for launching vehicles to space. Also, there is a need for launching vehicles to space at higher speed. The embodiments herein achieve this by providing "An apparatus for transporting a vehicle to space". Referring now to the drawing and more particularly to FIG. 1 where similar reference characters denote corresponding features consistently throughout the figures, there are shown preferred embodiments.

FIG. 1 illustrates a schematic diagram of an apparatus 100 for transporting a vehicle to space. The apparatus 100 includes a vertical tower 101, a horizontal pipe 102, a horizontal inlet pipe 105, valves 104, 106, plurality of shutters 107, 113, 114, 115, vehicle 111, platform 112.

In an embodiment, the vertical tower 101 includes an upper end 116 and a lower end 117. The lower end 117 of the vertical tower 101 is placed below the sea level 108 in the sea 109. The vertical tower 101 is filled with sea water, wherein water in the vertical tower 101 is maintained at a constant level. A plurality of high efficiency pumps are provided along the height of the vertical tower 101 for pumping and filling water through the upper end 116. In an embodiment, the plurality of shutters 107, 113, 114, 115 is placed at intervals in the vertical tower 101. The plurality of shutters is provided for dividing the water present in vertical tower 101, and enabling the shutters to withstand the pressure of water. Height of the vertical tower is 100 km for extending till the Kármán line. The Kármán line is 100 km (about 62 miles) above Earths mean sea level.

In an embodiment, a plurality of float sensors is provided inside the vertical tower 101 at intervals. A float sensor is provided below each shutter 107, 113, 114, and 115 for identifying the level of water. The float sensors detect the level of water and send the detected signal to microcontroller connected to it. The microcontroller is configured for opening and closing the plurality of shutters 107, 113, 114, 115 based on a signal from the plurality of float sensors.

In an embodiment, the shutter 107 opens when the float sensor below the shutter 107 detects water level till level of the horizontal inlet pipe 105. When the water level reaches below the shutter 113, the float sensor below the shutter 113 is configured for detecting and sending a signal to the microcontroller for closing the shutter 107 and simultaneously opening the shutter 113. Similarly, when the water level reaches below the shutter 114, the float sensor below the shutter 114 is configured for detecting and sending a signal to the microcontroller for closing the shutter 113 and simultaneously opening the shutter 114. Finally, when the water level reaches below the shutter 115, the float sensor below the shutter 115 is configured for detecting and sending a signal to the microcontroller for closing the shutter 114 and simultaneously opening the shutter 115. A float sensor is provided below the upper end 116. When the water level reached below the upper end 116, the float sensor detects and sends a signal to the microcontroller for closing the shutter 115.

In an embodiment, the plurality of shutters 107, 113, 114, 115 are also operated manually using electric motors. Motor operated shutters are provided optionally as an alternative for closing and opening the shutters 107, 113, 114, 115 when the float sensors are not used.

In an embodiment, the valves 104, 106 are operated using sensors. The valves can be operated manually using electric motors.

In an embodiment, the vertical tower can be built by using conventional means of construction. In another embodiment, the vertical tower can be constructed by means of space tethering.

The horizontal pipe 102 is connected at the lower end 117 of the vertical tower 101. The horizontal pipe 102 is fitted with a valve 104. The valve 104 when opened lets out water from the horizontal pipe 102. The horizontal pipe 102 extends into the sea shore 110.

In an embodiment, the horizontal inlet pipe 105 is connected to the vertical tower 101 just below sea level. The horizontal inlet pipe 105 is fitted with a valve 106. The valve 106 when opened, allows water into the horizontal inlet pipe 105 from the sea 109. The opening of the horizontal inlet pipe 105 includes water filter for filtering water entering from the sea into the horizontal inlet pipe 105.

In an embodiment, the platform 112 is provided at the upper end 116 of the vertical tower 101. The platform 112 is provided for placing the vehicles 111 transported to the upper end 116 from the lower end 117 of the vertical tower 101.

In an embodiment, the vehicle 111 is placed at the intersection of the horizontal pipe 102 and the vertical tower 101. The density of the vehicle 111 is lesser than the density of sea water. The vehicle 111 is transported from the lower end 117 of the vertical tower to the upper end 116 of the vertical tower 101 due to positive buoyancy. In an embodiment, the vehicle 111 is a launcher. The vehicle 111 can be manned or unmanned.

In an embodiment, material of the vertical tower 101, horizontal pipe 102, horizontal inlet pipe 105, valves 104 and 106, shutters 107, 113, 114, 115 is corrosion resistant and does not corrode in salty sea water. In a preferred embodiment, aluminium is the material used for the vertical tower 101, horizontal pipe 102, horizontal inlet pipe 105, valves 104 and 106, shutters 107, 113, 114, 115 as it is corrosion resistant.

In an embodiment, the vehicle 111 is constructed similar to the conventional Atlantis shuttle. The vehicle 111 can accommodate man and material for floating from the lower end 117 till the upper end 116 of the vertical tower 101. After reaching the platform 112, the vehicle can fly down to a desired destination on the earth.

In another embodiment, the vehicle 111 is constructed in a shape of a sphere. The sphere shaped vehicle 111 can accommodate both man and material and float from the lower end 117 to the upper end 116 of the vertical tower 101. A track along the vertical tower 101 is designed for holding the sphere shaped vehicle 111 and transporting it to the earth from the platform 112. The track is a circular shaped track for holding the sphere shaped vehicle 111 looped along the vertical tower 101, similar to the conventional roller coaster tracks.

In another embodiment, the vehicle 111 is constructed in any desired shape. After floating through the vertical tower 101 to the platform 112, the vehicle 111 can be modified to fly. The modified vehicle 111 can now land in the earth using the flying means.

The shape of the vehicle 111 is not limited to the above embodiments. The vehicle 111 can be modified to any shape for floating through the vertical tower 111 and perform landing back to the earth.

In an embodiment, the method of using the apparatus 100 is described in the following steps.

First, the vertical tower 101 is filled with sea water from the shutter 107 to the upper end 116 of the vertical tower 101. Conventional means of pumping is used for filling the vertical tower 101 with water from the sea. High efficiency pumps are used for filling water in the vertical tower 101. A plurality of pumps is fixed along the height of the vertical tower 101 for filling water in the vertical tower 101. The height of water in the vertical tower 101 is maintained constant from the shutter 107 till the upper end 116.

After the vertical tower 101 is filled, and the plurality of shutters 107, 113, 114, 115 is closed, the valve 104 is opened. The vertical tower 101 below the shutter 107, the horizontal inlet pipe 105 and the horizontal pipe 102 are not filled with water and remain empty. The vehicle is driven from an opening of the horizontal pipe 102, through the horizontal pipe till the lower end 117 of the vertical tower 101 at the intersection of the vertical tower 101 and the horizontal pipe 102. Now, the valve 104 is closed.

Now, the inlet valve 106 is opened for allowing sea water in the horizontal inlet pipe 105. The water from the horizontal inlet pipe 105 flows downward into the vertical tower 101 and water is filled in the vertical tower 101 below the shutter 107 till the lower end 117. Now, the inlet valve 106 of the horizontal pipe 105 is closed.

The flow of water allows the vehicle 111, having density lesser than water, to float till the level of water below the shutter 107, due to positive buoyancy. The shutter 107 is opened after the vehicle 111 reaches position below the shutter 107, for launching the vehicle through the vertical tower 101 to the upper end 116 above Kármán line. The opening of the shutter 107 allows the flow of water filled in the vertical tower 101 downward till the level of water already present in the vertical tower 101. The flow of water allows the vehicle 111 to float upwards till the next closed shutter 113. When the vehicle reaches the position below the shutter 113, the shutter 107 is closed. The level of water below the shutter 113 is reduced due to gap between the shutter 107 and the sea level 108.

Next, the shutter 113 is opened, wherein the vehicle 111 floats to the next closed shutter 114. The shutter 113 is closed. The level of water below the closed shutter 114 maintains the reduction obtained due to the gap between the shutter 107 and the sea level 108.

Next, the shutter 114 opens wherein the vehicle 111 floats to the level of water below the closed shutter 115. Now, the shutter 114 is closed.

When, the shutter 115 is opened the vehicle floats to the upper end 116 of the vertical tower 101. The shutter 115 is now closed. The level of water below the upper end 116 maintains the reduction due to the gap between the shutter 107 and the sea level. The vehicle 111 is lifted from the upper end 116 of the vertical tower using a lifting means. The lifting means places the vehicle 111 on the platform 112. In an embodiment, the lifting means is a magnetic device.

In an embodiment, after the transportation of the vehicle 111 till the upper end 116, the level of water in the vertical tower 101 is reduced. The reduction in the level of water is directly proportional to the gap between the shutter 107 and the sea level 108. In an example embodiment, the diameter of vertical tower 101 is "d" meters and a gap between the lower most shutter 107 and the sea level 108 is "g" meters. Hence, the volume of water reduced can be obtained according to volume of cylinder, $\pi*r*h$. Here, radius r is d/2 and height h is g. Hence, volume of water reduced is $\pi/2*d/2*g$ kL. The calculated volume of water is filled in the vertical tower 101 at the upper end 116 to compensate the reduction in level of water.

In an embodiment, a plurality of wind turbines is placed on outer surface of the vertical tower 101. The wind turbines are provided for generating electricity. In an embodiment, electricity generated from the plurality of wind turbines is used to pump water to upper end 116 of the vertical tower 101 to compensate the reduction in level of water.

After transportation of the vehicle 111 to the platform 112 from the upper end 116 of the vertical tower 101, the valve 104 is opened for letting out water present below the closed shutter 107 in the vertical tower 101.

In an embodiment, a turbine is placed at opening of the horizontal pipe 102 in the sea shore 110 for generating electricity during outflow of water.

A main advantage of the present invention is that it provides an apparatus for transporting vehicles to space at a higher speed.

Another advantage of the present invention is that it provides an economical apparatus for transporting vehicles to space.

Yet another advantage of the present invention is that it provides an apparatus for transporting vehicles to space with higher safety and no error.

Still another advantage of the present invention is that it provides an environmental friendly apparatus for transporting vehicles to space.

Another advantage of the present invention is that apparatus helps in reusing launched satellites.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. An apparatus 100 for vertically transporting a vehicle 111 comprising:
    a vertical tower 101 having an upper end 116 and a lower end 117 wherein the lower end 117 is below sea level 108;
    a horizontal pipe 102, connected to the lower end 117 of the vertical tower 101, extending underground to sea shore 110;
    characterized in that
    the vertical tower 101 filled with water;
    the horizontal pipe 102 including a valve 104 for outlet of water;
    a horizontal inlet pipe 105 connected to the vertical tower 101 below the sea level 108;
    the horizontal inlet pipe 105 including a valve 106 for inlet of water;
    a plurality of shutters 107, 113, 114, 115 placed at intervals in the vertical tower 101; and
    a platform 112 provided at the upper end 116 of the vertical tower 101.

2. The apparatus as claimed in claim 1, wherein height of the vertical tower 101 is 100 km for extending to Kármán line.

3. The apparatus as claimed in claim 1, wherein shape of the vertical tower 101 is cylindrical.

4. The apparatus as claimed in claim 1, wherein the vehicle 111 is a launcher.

5. The apparatus as claimed in claim 1, wherein the vehicle 111 placed at the intersection of the horizontal pipe 102 and the vertical tower 101.

6. The apparatus as claimed in claim 1, wherein density of the vehicle 111 is lesser than water.

7. The apparatus as claimed in claim 1, wherein a plurality of wind turbines placed on outer surface of the vertical tower 101 for generating electricity.

\* \* \* \* \*